Oct. 15, 1940.   F. H. EHNTS   2,217,737
LUBRICATING FITTING
Filed April 20, 1938
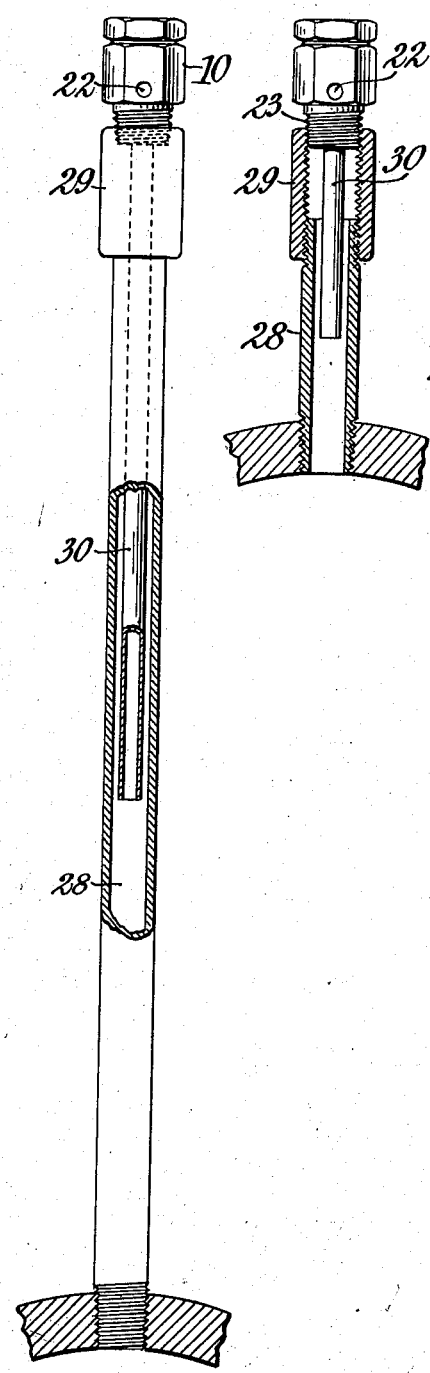
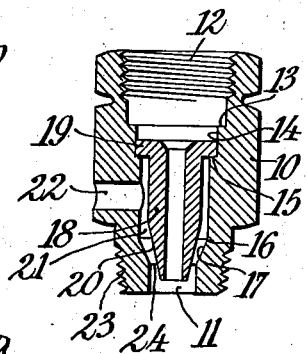
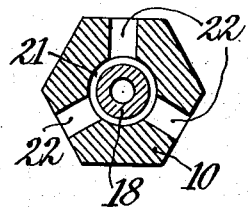
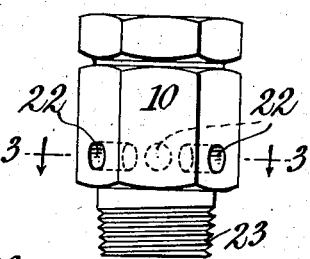
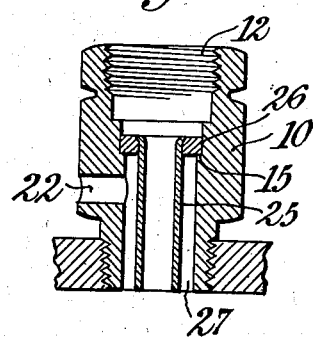
INVENTOR
Fred H. Ehnts,
BY
Fraser, Myers & Manley
ATTORNEYS.

Patented Oct. 15, 1940

2,217,737

UNITED STATES PATENT OFFICE 2,217,737

LUBRICATING FITTING

Fred Henry Ehnts, Lansdowne, Pa., assignor to Keystone Lubricating Company, Philadelphia, Pa., a corporation of Pennsylvania Application April 29, 1939, Serial No. 263,011

6 Claims. (Cl. 184—105)

My present invention relates to fittings for low pressure lubrication for ball and roller bearings, and aims to provide certain improvements therein. More particularly, it relates to such fittings which provide a tell-tale or indication when the bearing being lubricated has been supplied with the requisite amount of grease.

Lubrication of ball and roller bearings has always presented a real problem. The practice conventionally followed has been to inject the grease under pressure into a bearing either by means of a high pressure grease gun through a high pressure fitting, or by a hand compression cup. With either device the risk of under-lubrication is obvious. Even more serious, however, is the danger of over-lubrication, which results in power losses, overheating caused by internal friction and excessive wear, the placing of undue stresses on the bearing races, and the wasting of lubricant. Recognizing these inherent dangers, bearing manufacturers recommend that the bearing be charged no more than two-thirds full of grease.

Until quite recently no means were available for indicating when a bearing has been properly charged with lubricant and one had to trust to chance that enough, and not too much, grease has been supplied to a bearing. This was especially true where the bearings were located at inaccessible places which necessitated the use of extension tubes leading from the bearings and through which the grease had to be supplied to the bearings.

My present invention has for its primary object the provision of a fitting which will eliminate the hazards of bearing lubrication above pointed out. A further object is to provide a simple fitting which will indicate in a visible manner when a bearing has been properly and adequately charged with lubricant. A further object is to provide such fitting which will be usable with any conventional type of high pressure fitting or with a hand compression grease cup by interposition of the fitting of my invention between the conventional lubricating means and the bearing to be lubricated. A further object is to provide a fitting which can be embodied in or used with an extension tube and thereby provide a tell-tale for insuring proper lubrication of bearings located at remote and inaccessible points. A further object is to provide such fitting which will be simple in construction with no parts subject to becoming dislocated in use and hence foolproof in operation, and which can be manufactured and sold at a fair price.

To accomplish the foregoing and other objects not specifically enumerated, I provide a fitting which preferably consists of a tubular casing having means for engagement with a source of viscous lubricant material, means for attachment to a member for receiving the lubricant upon discharge from the fitting under pressure, said casing having a shoulder and a tubular element disposed within the bore of the casing in spaced relation to the wall of said bore having a part seating upon said shoulder and said casing having an opening therein providing open communication between the exterior of the casing and the space within the casing between the wall of the bore thereof and the outer wall of the tubular element therein. The invention will be better understood from the detailed description which follows, when considered in conjunction with the accompanying drawing, wherein:

Figure 1 is a diametrical section through a preferred form of fitting embodying my invention.

Fig. 2 is a side elevation of the fitting shown in Fig. 1.

Fig. 3 is a horizontal section taken along the plane of the line 3—3 of Fig. 2.

Fig. 4 is a diametrical section through a slight modification of the invention.

Figs. 5 and 6 are side elevations, partly in section, of further modifications showing the applicability of the invention for lubricating bearings through extension tubes leading therefrom.

Referring first to Figs. 1 to 3 of the drawing, the fitting may be said to consist of a tubular casing 10, herein shown as being of hexagonal cross-section, and having a bore 11 therethrough of progressively increasing diameter from one end thereof to the other. The enlarged bore at the top of said casing is internally screw-threaded, as indicated at 12, and said bore terminates in a shoulder 13 leading to a bore 14 terminating in a shoulder 15, and from there proceeding in further reduced diameter to a point 16 wherefrom it proceeds in tapered form 17 to the bore of smallest diameter at the bottom of the casing. Disposed within the casing is a tubular element 18, which, at its top, is formed with an integral flange 19 which seats on the shoulder 15. At its lower end the tubular element 18 is tapered, as indicated at 20, and terminates at a point adjacent the lower end of the casing. Preferably the tubular element 18 is held within the casing by force-fitting the flange 19 through the bore 14 until said flange seats upon the shoulder 15. If desired, the shoulder 13 may be slightly upset inwardly to provide an overhang for the flange 19 to positively prevent the removal of the tubular element from the casing. The tubular element 18, it will be noted, is of smaller diameter than the bores of the casing through which it extends, thereby providing a chamber 21 between said tubular element and the inner wall of the bore of the casing. The casing 18 is formed with one or more openings 22 therethrough leading from the chamber 21 to the exterior of the casing for a purpose which will be presently described. At its lower end the casing is somewhat reduced in diameter and externally screw-threaded, as indicated at 23.

The screw-threaded portion 23 is adapted to engage in the bearing housing of a ball or roller bearing (not shown), while the screw-threaded portion 12 is adapted to accommodate any conventional form of high pressure lubricating fitting or a hand compression grease cup (not shown), and to receive the viscous lubricant from said members for charging into the bearing.

When the viscous lubricant which has been charged into the bearing has reached a predetermined amount, determined by the calibration of the cross-sectional area of the annular opening 24 between the tubular element 18 and the wall of the bore through the casing, the back pressure built up by said lubricant will flow backwardly into the chamber 21 and out through the openings 22 to provide a visible tell-tale indicating that the bearing has been adequately charged with lubricant. By varying the area of the opening 24 the back pressure at which the lubricant will provide a tell-tale, can be controlled.

In the embodiment of my invention shown in Fig. 4 the bore through the casing below the shoulder 15 is of uniform diameter and the tubular element 25 is likewise of uniform diameter and extends to a point which is substantially flush with the bottom of the casing 18. In this embodiment of my invention I prefer to form the flange 26 on the tubular element from a separate piece of material in the form of a washer which may be riveted or otherwise secured to the end of the tubular portion. The cross-sectional area of the annular opening 27 between the lower end of the tubular element 25 and the wall of the bore of the casing will govern the back pressure at which the viscous lubricant will move backwardly from the bearing being charged, and out through the openings 22.

Under certain circumstances the ball and roller bearings to be lubricated are located at points which are normally inaccessible for a grease gun or grease cup, and in order to provide for the lubrication of such inaccessible bearings they are provided with an extension tube, such as 28, which is fitted at its outer end with a coupling sleeve 29 adapted to accommodate the lubricating fitting. Where tubular extension members of the type described are used I have found that by slightly modifying the construction of my lubricating fitting I am able to provide a visible telltale means for indicating when proper lubrication of the bearing has been obtained. This I accomplish by increasing the length of the tubular element of the fitting so as to extend well into the tubular extension member 28, as shown at 30 in Figs. 5 and 6. I have found, however, that the degree to which this tubular element must extend into the extension member will vary as the length of the extension member varies; and further, that the relative increase in length of the tubular element will be at a slower rate than the increase in length of the tubular extension member. With standard one-eighth inch iron pipe extension members having a tubular element of approximately one-eighth inch diameter, I have found the following comparative lengths of the extension members and tubular elements to give the proper tell-tale indication when lubricating ball bearings. For two, four and six inch extension members the tubular member should terminate about one, two and three inches, respectively, from the inner end of the extension members. Beyond this point, for each two inch increase in length of the extension member up to twelve inches the tubular element will increase in length about one and one-quarter inches.

I have also found that when the extension type of tell-tale fitting is used it is desirable that the extension member be first filled with lubricant before undertaking to charge the bearing with lubricant. Accordingly, in using my invention on extension members it is preferable that the extension tube be first removed from the bearing and the lubricant charged into the charging end of the fitting holding the finger over the discharge end of the extension member until the tell-tale discharge of lubricant through the openings 22 is obtained. The extension member is then screwed into the bearing and the charging of the bearing is proceeded with until the lubricant again issues forth from the openings 22. When this occurs, it is an indication that the bearing is adequately lubricated.

I have not definitely ascertained the precise relationship between the lengths and diameters of extension members with respect to the tubular extensions therein for other than standard one-eighth inch iron pipe and substantially one-eighth inch tubular extension elements, but it will be apparent that for extension members of different characters and dimensions the relative lengths of these members may be experimentally ascertained.

From the foregoing detailed description it will be apparent that I have devised a simple and practicable fitting for insuring adequate lubrication of ball and roller bearings and guarding against overcharging such bearings with lubricant, and while I have shown and described certain preferred embodiments of my invention it is to be understood that I do not wish to be limited to the details of construction disclosed since the same may be varied within the range of engineering skill without departing from the spirit of my invention.

What I claim is:

1. A lubricating fitting comprising a tubular casing having means for engagement with a source of viscous lubricant, means for attachment to a member for receiving the lubricant upon discharge from the fitting under pressure, said casing having a shoulder and a tubular element disposed within the bore of the casing in spaced relation to the wall of said bore and having a part seating on said shoulder, and said casing having an opening therein providing open communication between the exterior of the casing and the space between the wall of the casing bore and the outer wall of the tubular element.

2. A lubricating fitting comprising a tubular casing having means within its bore for engagement with a supplemental fitting for charging viscous lubricant through the casing, means for attachment to a member for receiving the lubricant upon discharge from the fitting under pressure, said casing having a shoulder within its bore inwardly of the supplemental fitting engagement means and a tubular element disposed within the bore of the casing in spaced relation to the wall of said bore and having a part seating on said shoulder, and said casing having an opening therein providing open communication between the exterior of the casing and the space between the wall of the casing bore and the outer wall of the tubular element.

3. A lubricating fitting comprising a tubular casing having screw-threaded means within its bore for engagement with a supplemental fitting for charging viscous lubricant through the casing, external screw-threaded means for attachment to a member for receiving the lubricant upon discharge from the fitting under pressure, said casing having a shoulder within its bore inwardly of the screw-threaded means and a tubular element disposed within the bore of the casing in spaced relation to the wall of said tube and having a flange at one end seating on said shoulder and being held in fixed relation thereon, and said casing having an opening therein providing open communication between the exterior of the casing and the space between the wall of the casing bore and the outer wall of the tubular element.

4. A lubricating fitting comprising a tubular casing having means for engagement with a source of viscous lubricant, a tubular extension member adapted for connection with a chamber for receiving the lubricant upon discharge from the fitting under pressure and a tubular element disposed within the bore of said casing and projecting a substantial distance beyond the end of the casing into the tubular extension member and terminating rearwardly of the end of said extension member, the outer wall of said tubular element being disposed in spaced relation to the walls of the bores of the casing and the extension member.

5. A tell-tale lubricating fitting for indicating at a point remote from a bearing housing to be lubricated when said bearing housing has been properly lubricated, comprising a tubular member one end of which has means for attachment to a bearing housing for receiving viscous lubricant, means within the tubular member for constraining the passage of lubricant through said member, said constraining means terminating rearwardly of the discharge end of the tubular member and the other end of the tubular member having means for engagement with a source of viscous lubricant which is adapted to be discharged through the tubular member into the bearing housing and said tubular member at a point remote rearwardly from the discharge end thereof being formed to provide a visual indication when the pressure of lubricant in the bearing is greater than required therein.

6. A tell-tale lubricating fitting for indicating at a point remote from a bearing housing to be lubricated when said bearing housing has been properly lubricated, comprising a tubular member one end of which has means for attachment to a bearing housing for receiving viscous lubricant, a tubular element within the tubular member and spaced from the inner wall thereof, said tubular element having one end spaced rearwardly of the discharge end of the tubular member and the other end of the tubular element having means for engagement with a source of viscous lubricant, said tubular element being adapted to have the viscous lubricant discharged therethrough into the tubular member and from there into the bearing housing, said tubular member adjacent its outer end having an opening therein providing open communication between the exterior of said member and the space between the walls of the tubular member and the tubular element, the various parts of the fitting being fixed relatively to each other in use.

FRED HENRY EHNTS.